(12) United States Patent
Ogata

(10) Patent No.: US 10,378,669 B2
(45) Date of Patent: Aug. 13, 2019

(54) THROTTLE VALVE CONTROL DEVICE

(71) Applicant: Hitachi Automotive Systems, Ltd., Hitachinaka-shi, Ibaraki (JP)

(72) Inventor: Takao Ogata, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/744,113

(22) PCT Filed: Jul. 28, 2016

(86) PCT No.: PCT/JP2016/072093
§ 371 (c)(1),
(2) Date: Jan. 12, 2018

(87) PCT Pub. No.: WO2017/038325
PCT Pub. Date: Mar. 9, 2017

(65) Prior Publication Data
US 2018/0202568 A1   Jul. 19, 2018

(30) Foreign Application Priority Data
Sep. 2, 2015   (JP) .................................. 2015-172459

(51) Int. Cl.
| F16K 27/00 | (2006.01) |
| F16K 31/04 | (2006.01) |
| F02B 37/12 | (2006.01) |
| F02D 9/02  | (2006.01) |
| F02D 9/10  | (2006.01) |

(Continued)

(52) U.S. Cl.
CPC ............ *F16K 31/043* (2013.01); *F02B 37/12* (2013.01); *F02D 9/02* (2013.01); *F02D 9/10* (2013.01);

(Continued)

(58) Field of Classification Search
CPC .. F16K 31/043; F16K 27/00; H01M 8/04753; H01M 8/04798; F02D 9/02; F02D 9/10

(Continued)

(56) References Cited

U.S. PATENT DOCUMENTS

| 5,752,484 A * | 5/1998 | Apel ........................ F02D 9/02 |
| | | 123/396 |
| 7,412,964 B2 * | 8/2008 | Kondo .................. H02K 7/116 |
| | | 123/336 |

(Continued)

FOREIGN PATENT DOCUMENTS

| EP | 1 308 612 A1 | 5/2003 |
| JP | 10-184400 A  | 7/1998 |

(Continued)

OTHER PUBLICATIONS

International Search Report (PCT/ISA/210) issued in PCT Application No. PCT/JP2016/072093 dated Sep. 20, 2016 with English translation (2 pages).

(Continued)

Primary Examiner — Matthew W Jellett
(74) Attorney, Agent, or Firm — Crowell & Moring LLP

(57) ABSTRACT

Provided is a throttle valve control device having sufficient reliability while having three attachment holes of the throttle valve control device. A throttle valve control device 1 includes a throttle body 2 having an intake passage 3, drives a throttle valve 8 for controlling an intake air flow rate or a pressure, disposed in the intake passage, with a motor 4 via a throttle gear 10, and is attached externally with a bolt inserted into an attachment hole formed in the throttle body. The throttle valve control device 1 is characterized in that only three attachment holes are formed in the throttle body, one attachment hole 19 among the three attachment holes is formed closer to a center of gravity of the throttle valve control device than the other two attachment holes 20 and (Continued)

21, and the one attachment hole is formed between the motor and a throttle shaft.

6 Claims, 3 Drawing Sheets

(51) Int. Cl.
  *H01M 8/04* (2016.01)
  *H01M 8/04746* (2016.01)
  *H01M 8/04791* (2016.01)

(52) U.S. Cl.
  CPC ............... *F16K 27/00* (2013.01); *H01M 8/04* (2013.01); *H01M 8/04753* (2013.01); *H01M 8/04798* (2013.01); *H01M 2250/20* (2013.01); *Y02T 10/144* (2013.01); *Y02T 90/32* (2013.01)

(58) Field of Classification Search
  USPC .................................. 251/129.11, 250.5, 305
  See application file for complete search history.

(56) References Cited

U.S. PATENT DOCUMENTS

| | | |
|---|---|---|
| 2004/0040536 A1 | 3/2004 | Suzuki |
| 2004/0040538 A1 * | 3/2004 | Shimada ................. F02D 11/10 |
| | | 123/399 |
| 2008/0006241 A1 | 1/2008 | Hannewald et al. |
| 2009/0205611 A1 | 8/2009 | Tsugami et al. |
| 2011/0283970 A1 * | 11/2011 | Shimada ............... F02D 9/1065 |
| | | 123/337 |
| 2012/0247440 A1 * | 10/2012 | Sano ...................... F02M 26/70 |
| | | 123/568.17 |

FOREIGN PATENT DOCUMENTS

| | | |
|---|---|---|
| JP | 2003-184581 A | 7/2003 |
| JP | 5064370 B2 | 10/2012 |
| JP | 2013-104388 A | 5/2013 |
| JP | 2013-104392 A | 5/2013 |
| WO | WO 2005/078260 A1 | 8/2005 |

OTHER PUBLICATIONS

Japanese-language Written Opinion (PCT/ISA/237) issued in PCT Application No. PCT/JP2016/072093 dated Sep. 20, 2016 (3 pages).
Extended European Search Report issued in counterpart European Application No. 16841357.3 dated Apr. 1, 2019 (eight (8) pages).

\* cited by examiner

THROTTLE VALVE CONTROL DEVICE

TECHNICAL FIELD

The present invention relates to a throttle valve control device used in a vehicle, particularly to a motor-driven throttle valve control device for performing open/close control of a throttle valve by driving a motor based on a control signal.

BACKGROUND ART

Attachment of a throttle valve control device to an internal combustion engine of a vehicle is performed by inserting bolts into four attachment holes formed in a throttle body, and fastening the bolts to a side of the internal combustion engine, for example, as described in Publication of Patent No. 5064370 (PTL 1). This is performed in order to ensure reliability against environmental conditions. The environmental conditions are caused by vibration from a vehicle or an internal combustion engine, or input of temperature or the like.

However, the throttle valve control device with four attachment holes has a heavy weight, needs four holes for attachment destination, and further needs four attachment bolts. It is difficult to reduce weight or the number of parts.

As a countermeasure against this problem, for example, as illustrated in FIG. 2 of Japanese Patent Application Laid-Open No. 10-184400 (PTL 2), it is conceivable to attach a throttle valve control device with three holes.

CITATION LIST

Patent Literature

PTL 1: JP 5064370 B1
PTL 2: JP 10-184400 A

SUMMARY OF INVENTION

Technical Problem

In a case where three attachment holes are formed, airtightness with an attachment partner is not necessarily maintained, or a throttle valve control device or the attachment partner may be damaged due to large deformation depending on environmental conditions and the like.

Therefore, an object of the present invention is to provide a throttle valve control device having sufficient reliability while having three attachment holes of the throttle valve control device.

Solution to Problem

In order to solve the above problems, for example, a configuration described in claims is adopted. The present application includes a plurality of means for solving the above problems, and examples thereof include a throttle valve control device including a throttle body having an intake passage, the throttle valve control device driving a throttle valve for controlling an intake air flow rate or a pressure, disposed in the intake passage, with a motor via a throttle gear, and the throttle valve control device being attached externally with a bolt inserted into an attachment hole formed in the throttle body. The throttle valve control device is characterized in that only three attachment holes are formed in the throttle body, one attachment hole among the three attachment holes is formed closer to a center of gravity of the throttle valve control device than the other two attachment holes, and the one attachment hole is formed between the motor and a throttle shaft.

Advantageous Effects of Invention

The present invention can provide a throttle valve control device having sufficient reliability while having three attachment holes of the throttle valve control device.

Problems, configurations, and effects other than those described above will be clarified by the following description of embodiments.

DESCRIPTION OF EMBODIMENTS

Hereinafter, embodiments of the present invention will be described with reference to the drawings.

Incidentally, in the following description, a throttle valve control device for controlling an intake flow rate in an intake passage (bore) is exemplified. However, the present invention can foe also applied to a device for controlling a pressure in the intake passage (pressure control device). That is, a throttle valve of a throttle valve control device according to the present invention can be used as a supply pressure switching valve of a gasoline engine, as a suction pressure control valve of a diesel engine, or as a negative pressure control valve for controlling a hydrogen concentration of a fuel cell.

First Embodiment

Figure 1:
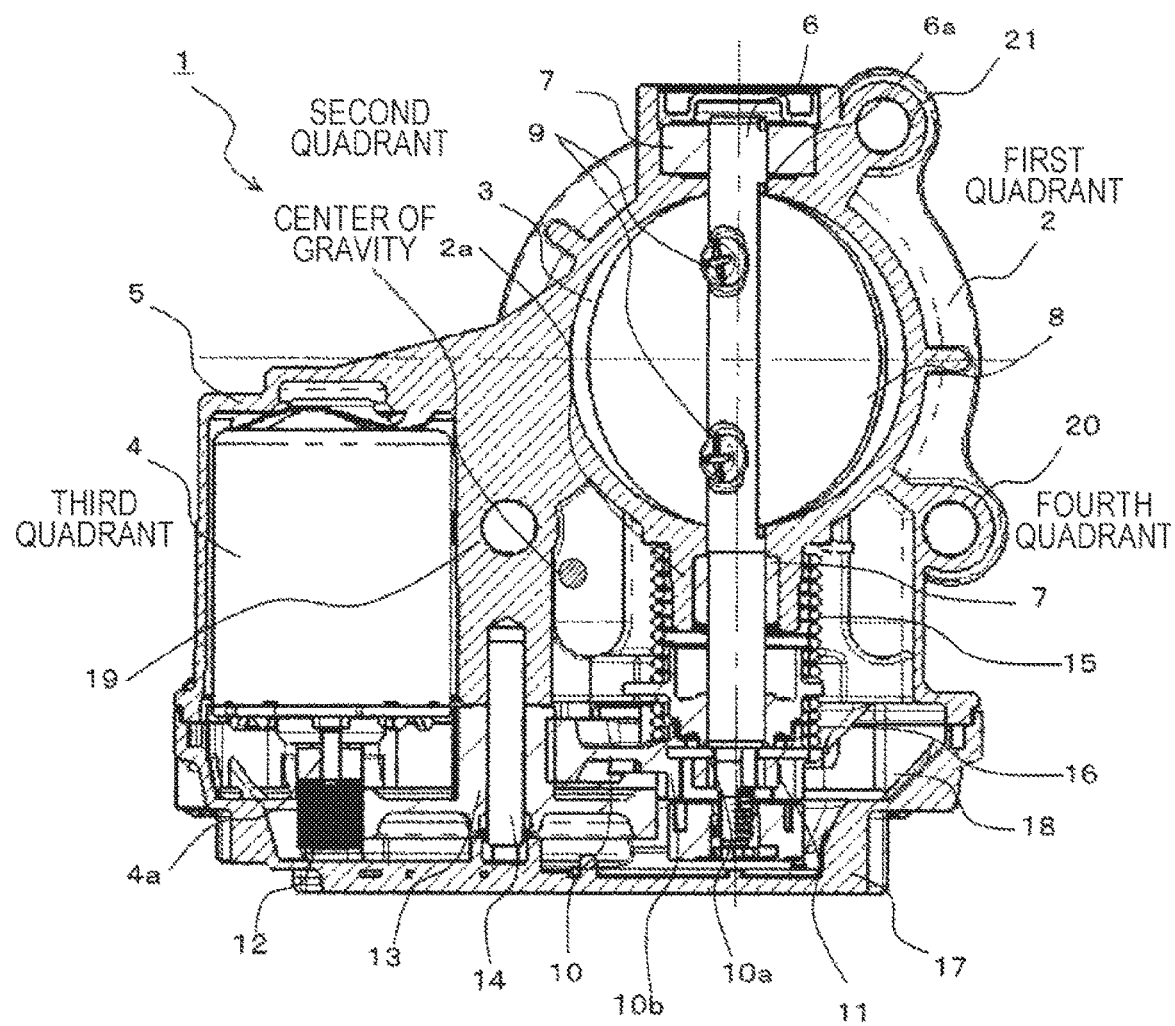
FIG. 1 is a cross-sectional view illustrating a basic configuration of a throttle valve control device (first embodiment).

FIG. 1 is a cross-sectional view illustrating a basic configuration of a throttle valve control device according to the present embodiment together with a quadrant and a position of the center of gravity.

As illustrated in FIG. 1, a throttle valve control device 1 includes a throttle body 2 made of, for example, aluminum die cast. An intake passage (bore) 3 and a motor housing 5 for housing a motor 4 as an electric actuator are formed in the throttle body 2.

Three attachment holes are formed in the throttle body 2, and the throttle body 2 is attached to an attachment destination (for example, an internal combustion engine) with bolts.

The throttle body 2 includes a throttle shaft 6 made of, for example, metal, and penetrating the intake passage 3 in a direction perpendicular to an axis of the intake passage 3. Both ends of the throttle shaft 6 are rotatably supported by bearings 7 and 7' press-fitted and fixed to the throttle body 2.

In the throttle shaft 6, a slit 6a extending in an axial direction of the throttle shaft 6 is formed, and a throttle valve 8 formed of, for example, a metallic disc is inserted into the slit 6a. The throttle valve 8 inserted into the slit 6a is fixed to the throttle shaft 6 with screws 9.

A throttle gear 10 is fastened and fixed to one end side of the throttle shaft 6 with a nut 11. The throttle gear 10 is constituted by a metal plate 10a and a resin gear portion 10b integrated with the metal plate 10a.

The motor 4 is housed in the motor housing 5 such that an output shaft (motor output shaft) 4a of the motor 4 is parallel to the throttle shaft 6. A gear (motor gear) 12 made of, for example, metal is fixed to an end of the motor output shaft 4a.

An intermediate gear 13 made of, for example, resin is disposed between the throttle gear 10 and the motor gear 12. The intermediate gear 13 is formed as a two-stage gear having a small-diameter gear portion meshing with the throttle gear 10 and a large-diameter gear portion meshing with the motor gear 12, and is rotatably supported by a metal shaft (gear shaft) 14 press-fitted and fixed to the throttle body 2. Between a rear surface (side of throttle valve 8) of the throttle gear 10 and a side surface of the throttle shaft 6, a return spring 15 for biasing a spring force in a closing direction to the throttle valve 8, formed by a helical spring, and a default spring 16 for biasing the throttle valve with a spring force toward a side of a predetermined opening degree (hereinafter, this opening degree is defined as a default opening degree) larger than a fully closed position as viewed from a fully closed position of the throttle valve when the motor is not energized, are held. When the motor is not energized, the opening degree is maintained at the default opening degree, and an air flow rate allowing a vehicle to travel at a certain speed can be secured even at the time of fail safe.

The throttle gear 10, the motor gear 12, the intermediate gear 13, the return spring 15, and the default spring 16 are disposed in a gear housing chamber 18 formed between a side surface portion of the throttle body 2 and a cover member (gear cover) 17 made of resin or the like and covering the side surface portion.

In such a configuration, when the motor 4 rotates by energization, the rotation of the motor 4 is transmitted to the throttle shaft 6 via the motor gear 12, the intermediate gear 13, and the throttle gear 10. At this time, the throttle shaft 6 rotates, and the throttle valve 8 opens or closes the intake passage 3. As a result, the opening area of the intake passage 3 is changed, and the intake air amount or the pressure of an internal combustion engine is adjusted.

Next, the three attachment holes formed in the throttle body 2 will be described.

As illustrated in FIG. 1, in a case where the throttle valve control device 1 is divided into four quadrants based on the center of the intake passage 3 formed by the throttle body 2, the three attachment holes are desirably formed in the first quadrant, the third quadrant, and the fourth quadrant, respectively. Here, each of the quadrants is obtained by dividing the throttle valve control device 1 into the first to fourth quadrants in a counterclockwise direction based on the center of the intake passage 3 when the intake passage 3 is viewed in a penetration direction of the intake passage 3 (direction along flow of intake air, in other words, front-rear direction of the sheet of FIG. 1) such that the throttle shaft 6 is located on the first and fourth quadrant side, the motor 4 is located on the second and third quadrant side, the throttle valve 8 is located on the first and second quadrant side, and the throttle gear 10 is located on the third and fourth quadrant side.

In the case of the present embodiment, the center of gravity of the throttle valve control device 1 is located in the third quadrant. One attachment hole 19 is formed in the third quadrant near a position of the center of gravity. By fixing the vicinity of the position of the center of gravity, reliability of fixing the throttle valve control device against vibration coming from an internal combustion engine, a vehicle, or the like can be enhanced.

A second attachment hole 20 is formed in the fourth quadrant. The fourth quadrant has a heavy weight due to the large number of constituent parts. Therefore, by fixing the vicinity of a portion having a heavy weight, reliability of fixing the throttle valve control device against vibration coming from an internal combustion engine or the like can be enhanced.

A remaining one attachment hole 21 is formed in the first quadrant. The motor 4 having a heavy weight is disposed in the third quadrant. By forming the remaining one hole in the first quadrant symmetrical with respect to the third quadrant having the attachment hole 19 close to the position of the center of gravity, there is an effect of suppressing vibration due to vibration around the attachment hole 19 is close to the position of the center of gravity.

Incidentally, if the motor 4 is designed so as to be small and the weight of the motor is reduced, the reliability due to the three attachment holes can be further enhanced. In the present embodiment, downgage is performed around a bearing boss portion 2a of the throttle shaft 6 of the throttle body 2.

Second Embodiment

Figure 2:
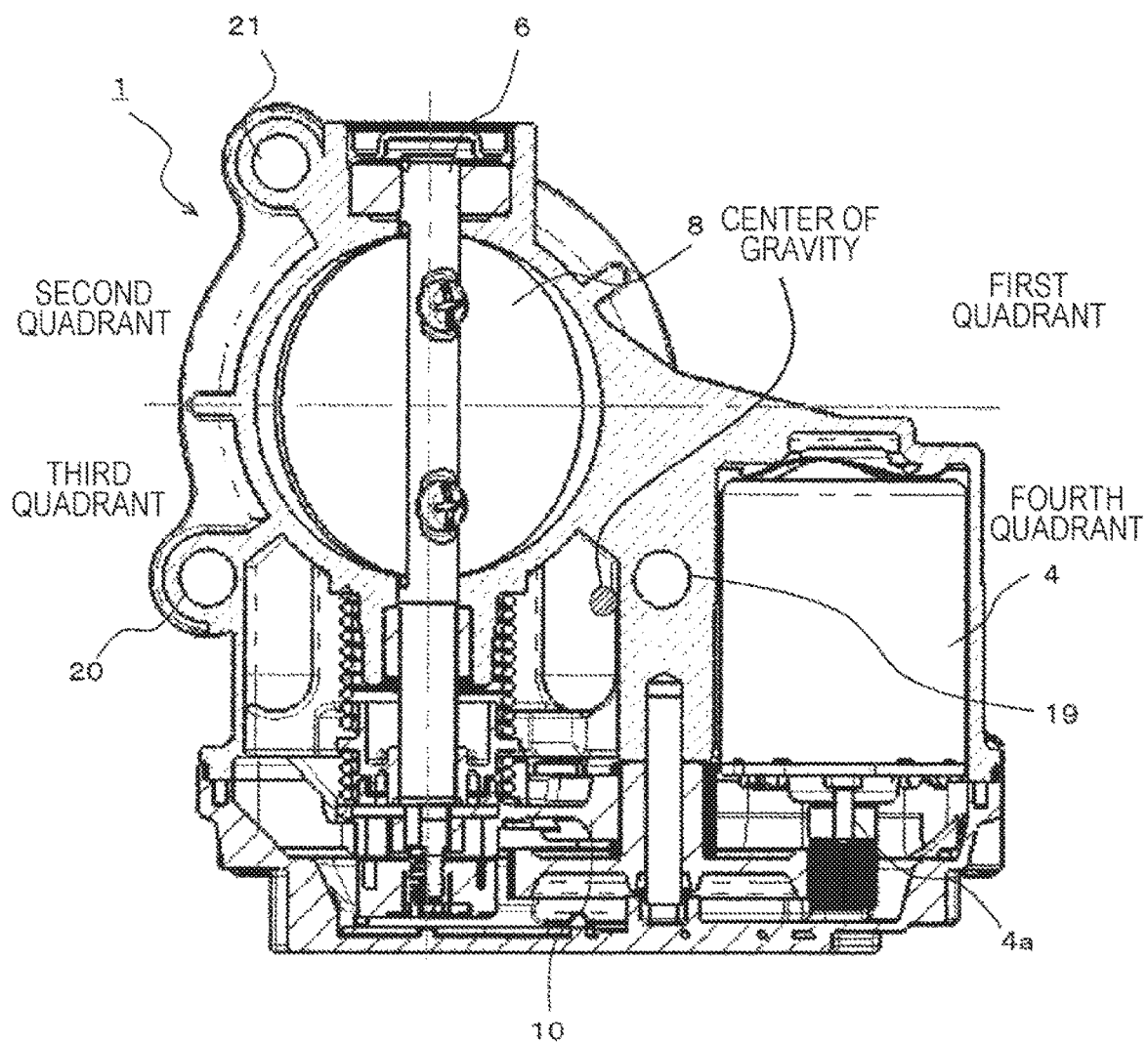
FIG. 2 is a cross-sectional view illustrating a basic configuration of a throttle valve control device (second embodiment).

FIG. 2 is a cross-sectional view illustrating a basic configuration of a throttle valve control device according to another embodiment of the present invention together with a quadrant and a position of the center of gravity. Description of parts having a similar configuration to the first embodiment will be omitted.

The present embodiment indicates a configuration obtained by horizontally inverting a positional relationship between the throttle shaft 6 and the motor 4 in the configuration of the first embodiment. That is, each of first to fourth quadrants is obtained by dividing a throttle valve control device 1 into the first to fourth quadrants in a counterclockwise direction based on the center of an intake passage 3 when the intake passage 3 is viewed in a penetration direction of the intake passage 3 such that a throttle shaft 6 is located on the second and third quadrant side, a motor 4 is located on the first and fourth quadrant side, a throttle valve 8 is located on the first and second quadrant side, and a throttle gear 10 is located on the third and fourth quadrant side.

In this case, in a case where the throttle valve control device 1 is divided into four quadrants based on the center of the intake passage 3 of a throttle body 2, three attachment holes are desirably formed in the second quadrant, the third quadrant, and the fourth quadrant, respectively.

In the case of the present embodiment, the position of the center of gravity is located in the fourth quadrant. Therefore, one attachment hole 19 is formed in the fourth quadrant near the position of the center of gravity.

A second attachment hole 20 is formed in the third quadrant. This is because the third quadrant includes many constituent parts, and is based on a similar way of thinking to that in the first embodiment.

A remaining one attachment hole 21 is formed in the second quadrant. The motor 4 having a heavy weight is disposed in the fourth quadrant. By forming the remaining one hole in the second quadrant symmetrical with respect to the fourth quadrant having the attachment hole 19 close to the position of the center of gravity, there is an effect of suppressing vibration due to vibration around the attachment hole 19 close to the position of the center of gravity. This is also based on a similar way of thinking to that in the first embodiment.

Incidentally, in a configuration in which the center of gravity of the throttle valve control device 1 is located between the throttle shaft 6 and the motor 4, if one attachment hole 19 is formed between the throttle shaft 6 and the motor 4, and the other two attachment holes (attachment holes 20 and 21) are formed on a side opposite to the throttle shaft 6 (anti-motor side), even if the attachment hole 19 is far away from the center of gravity, reliability against vibration coming from an internal combustion engine, a vehicle, or the like can be improved to some extent.

Figure 3:
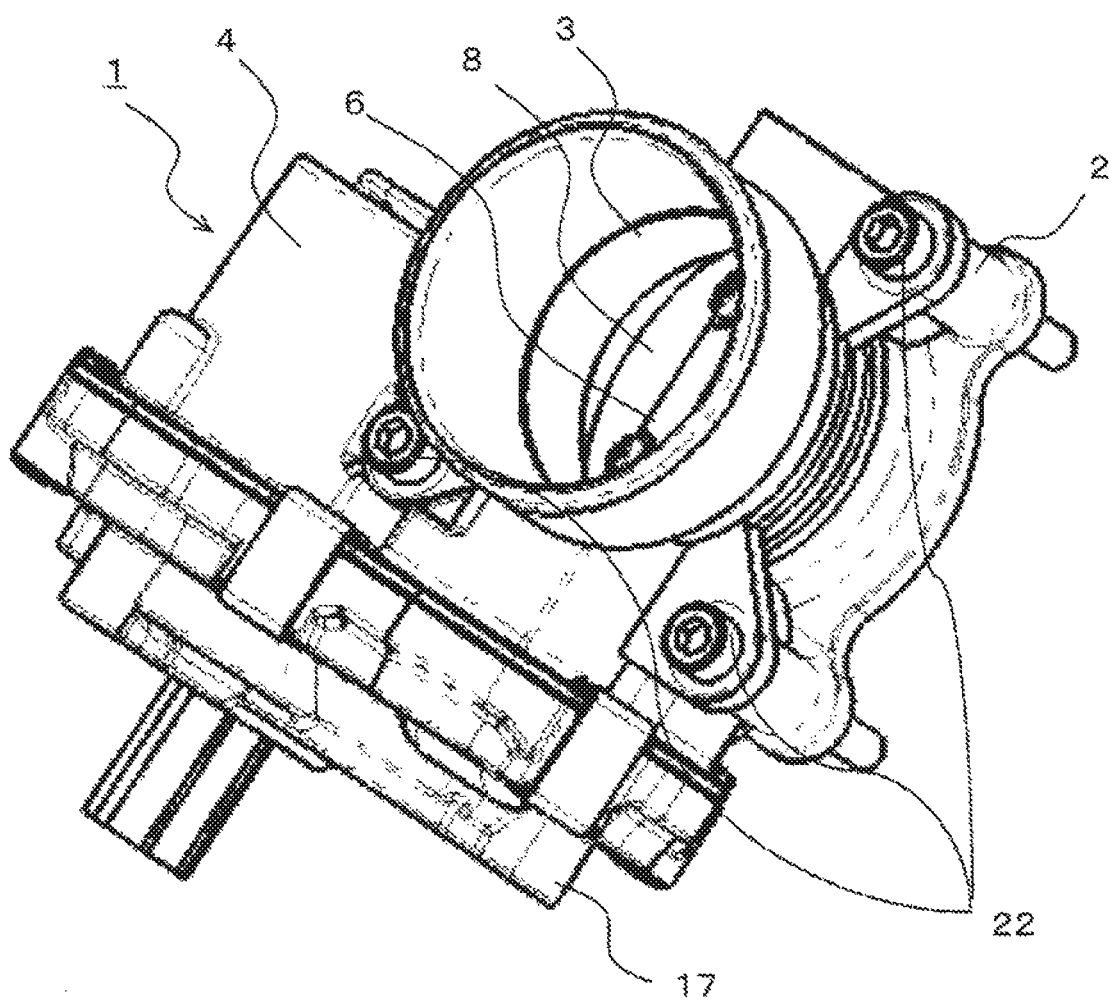
FIG. 3 is a perspective view illustrating a state in which a bolt is inserted into an attachment hole of the throttle valve control device according to any one of embodiments.

FIG. 3 is a perspective view illustrating a state in which the throttle valve control device 1 according to any one of the above embodiments is attached to an attachment destination (not illustrated) (for example, an internal combustion engine) with bolts.

The throttle valve control device 1 is attached by inserting bolts 22 into the three attachment holes 19, 20, and 21 formed in the throttle body 2, respectively, and fastening the bolts 22 to an attachment destination.

Incidentally, in FIG. 3, the throttle valve control device 1 of the first embodiment is exemplified, but also in a case of a configuration of the other embodiment, similarly, a throttle valve control device is attached by inserting bolts into the three attachment holes, respectively, and fastening the bolts to an attachment destination.

As described above, the present invention can provide a throttle valve control device capable of reducing weight and the number of parts while ensuring reliability.

The present invention is not limited to the embodiments described above, but includes various modification examples. For example, the above embodiments have been described in detail in order to explain the present invention so as to be understood easily. The present invention does not necessarily include all the components described above. In addition, it is possible to replace some components of an embodiment with components of another embodiment. In addition, if is also possible to add some components of an embodiment to another embodiment. Furthermore, some components of an embodiment can be deleted or replaced with other components, or another component can be added thereto.

REFERENCE SIGNS LIST 1 throttle valve control device
2 throttle body
2a bearing boss portion
3 intake passage (bore)
4 motor
5 motor housing
6 throttle shaft
6a slit
7 bearing
8 throttle valve
9 screw
10 throttle gear
11 nut
12 motor gear
13 intermediate gear
14 gear shaft
15 return spring
16 default spring
17 gear cover
18 gear housing chamber
19 attachment hole 1
20 attachment hole 2
21 attachment hole 3

The invention claimed is:

1. A throttle valve control device comprising a throttle body having an intake passage,
   the throttle valve control device driving a throttle valve for controlling an intake air flow rate or a pressure, disposed in the intake passage, with a motor via a throttle gear, and
   the throttle valve control device being attached externally with a bolt inserted into an attachment hole formed in the throttle body, wherein
   only three attachment holes are formed in the throttle body,
   one attachment hole among the three attachment holes is formed closer to a center of gravity of the throttle valve control device than the other two attachment holes,
   the one attachment hole is formed between the motor and a throttle shaft,
   the center of gravity is located separate from and immediately adjacent to a portion of the throttle body that defines the one attachment hole, and the other two attachment holes are formed on a side that is distal from the center of gravity.

2. A throttle valve control device comprising a throttle body having an intake passage,
   the throttle valve control device driving a throttle valve for controlling an intake air flow rate or a pressure, disposed in the intake passage, with a motor via a throttle gear, and
   the throttle valve control device being attached externally with a bolt inserted into an attachment hole formed in the throttle body, wherein
   only three attachment holes are formed in the throttle body,
   one attachment hole among the three attachment holes is formed on one side of a throttle shaft and the other two attachment holes are formed on a side opposite to the throttle shaft,
   the one attachment hole is formed between the motor and the throttle shaft, and
   the center of gravity is located separate from and immediately adjacent to a portion of the throttle body that defines the one attachment hole.

3. The throttle valve control device according to claim 1, wherein
   in a case where the throttle valve control device is divided into first to fourth quadrants in a counterclockwise direction based on a center of the intake passage when the intake passage is viewed in a penetration direction of the intake passage such that the throttle shaft is located on the first and fourth quadrant side and the motor is located on the second and third quadrant side, or the throttle shaft is located on the second and third quadrant side and the motor is located on the first and fourth quadrant side, and the throttle valve is located on the first and second quadrant side and the throttle gear is located on the third and fourth quadrant side,
   the motor is disposed in the same quadrant as the one attachment hole.

4. The throttle valve control device according to claim 1, wherein the throttle valve is used as a supply pressure switching valve of a gasoline engine.

5. The throttle valve control device according to claim 1, wherein the throttle valve is used as a suction pressure control valve of a diesel engine.

6. The throttle valve control device according to claim 1, wherein the throttle valve is used as a negative pressure control valve for controlling a hydrogen concentration of a fuel cell.

* * * * *